June 7, 1955 W. A. GOSS 2,709,881
TRACTOR MOWER SUPPORT MEANS
Filed March 7, 1951 7 Sheets-Sheet 2

INVENTOR.
WILLIAM A. GOSS
BY Whittemore,
Hulbert & Belknap
ATTORNEYS

June 7, 1955  W. A. GOSS  2,709,881
TRACTOR MOWER SUPPORT MEANS

Filed March 7, 1951  7 Sheets-Sheet 3

INVENTOR.
WILLIAM A. GOSS
BY Whittemore,
Hulbert & Belknap
ATTORNEYS

June 7, 1955  W. A. GOSS  2,709,881
TRACTOR MOWER SUPPORT MEANS
Filed March 7, 1951  7 Sheets-Sheet 4

INVENTOR.
WILLIAM A. GOSS.
BY
ATTORNEYS

June 7, 1955  W. A. GOSS  2,709,881
TRACTOR MOWER SUPPORT MEANS
Filed March 7, 1951  7 Sheets-Sheet 6

INVENTOR.
WILLIAM A. GOSS
BY Whittemore,
Hulbert & Belknap
ATTORNEYS

United States Patent Office 2,709,881
Patented June 7, 1955

2,709,881

TRACTOR MOWER SUPPORT MEANS

William A. Goss, Zanesville, Ohio, assignor to Detroit Harvester Company, Detroit, Mich., a corporation of Michigan Application March 7, 1951, Serial No. 214,337

2 Claims. (Cl. 56—25)

The present invention relates to a power mower and more particularly to power mower structure designed for quick and ready attachment to and detachment from a tractor.

It is an object of the present invention to provide mower structure adapted to be driven from the power take-off of a tractor and to include power means for adjusting the cutter bar.

It is a further object of the present invention to provide mowing mechanism for association with a tractor including power means for adjusting the cutter bar vertically and angularly to permit the mowing operation to be performed substantially at or above the ground level and also angularly with respect thereto both upwardly and downwardly from the ground level as may be required in mowing inclined banks or the like.

It is a further object of the present invention to provide a mower in association with a tractor including means for interrupting forward motion of the tractor in the event that the cutter bar encounters an obstacle tending to move the cutter bar rearwardly.

It is a further object of the present invention to provide a mower including novel adjustable supporting means for parts of the mower structure to permit accurate alignment between a pulley included in the mower structure and a pulley located on the power take-off of the tractor.

It is a further object of the present invention to provide novel supporting structure for a transversely extending drag bar.

It is a further object of the present invention to provide a mowing attachment characterized by the speed and facility with which it may be mounted on or removed from a tractor.

Other objects and features of the invention will become apparent as the description proceeds, especially when taken in conjunction with the accompanying drawings, wherein:

Figure 8 is an enlarged side elevation partly in section showing the connection between the propeller shaft and the means for reciprocating the sickle.

Figure 9 is an enlarged fragmentary plan view with parts in section showing the inner shoe and parts associated therewith.

Referring now to the figures, the mowing structure is illustrated as provided on a tractor 10 including rear wheels 12, front wheels 14, a driver's seat 16, a steering wheel 18, and control levers 20 and 22 for effecting power adjustment of the cutter bar as will subsequently appear. Adjacent the rear of the tractor there is provided a power take-off shaft 24 including a pulley 26 adapted to be driven in rotation by the power plate of the tractor.

The mower structure comprises an inner shoe 30 carried at the right hand end of a transversely extending drag bar 32, as will subsequently be described in detail. The inner shoe 30 is also connected to a propeller shaft located within a propeller shaft tube or housing 34 which extends from a rear propeller shaft housing 36. The inner shoe is urged forwardly by a tension spring 38 into cutting position but as will subsequently be described, the drag bar 32 is mounted with provision for limited rearward swinging so that the cutter bar 40 may swing rearwardly upon encountering an obstacle. Means are provided for interrupting forward motion of the tractor 10 upon predetermined rearward swinging of the cutter bar.

Figure 1:
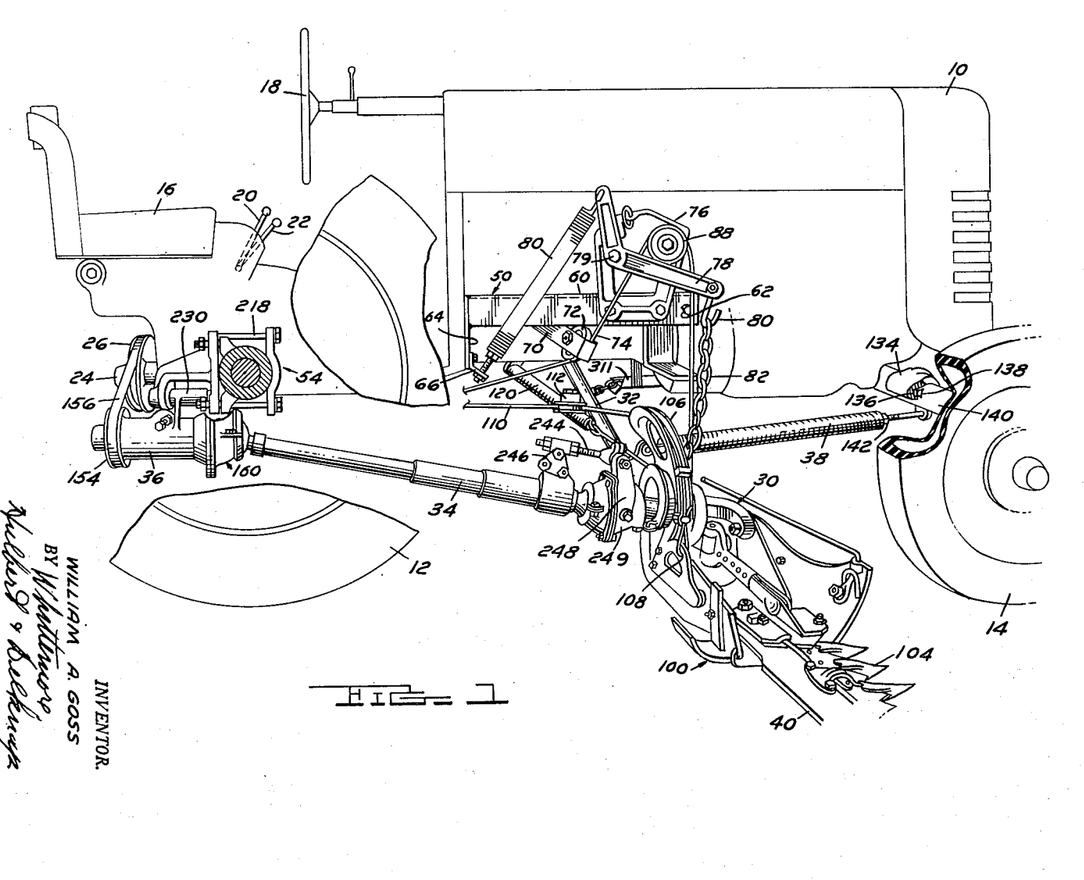
Figure 1 is a fragmentary perspective view from the right side of the tractor showing the combined tractor-mower assembly with parts broken away.
Figure 3:
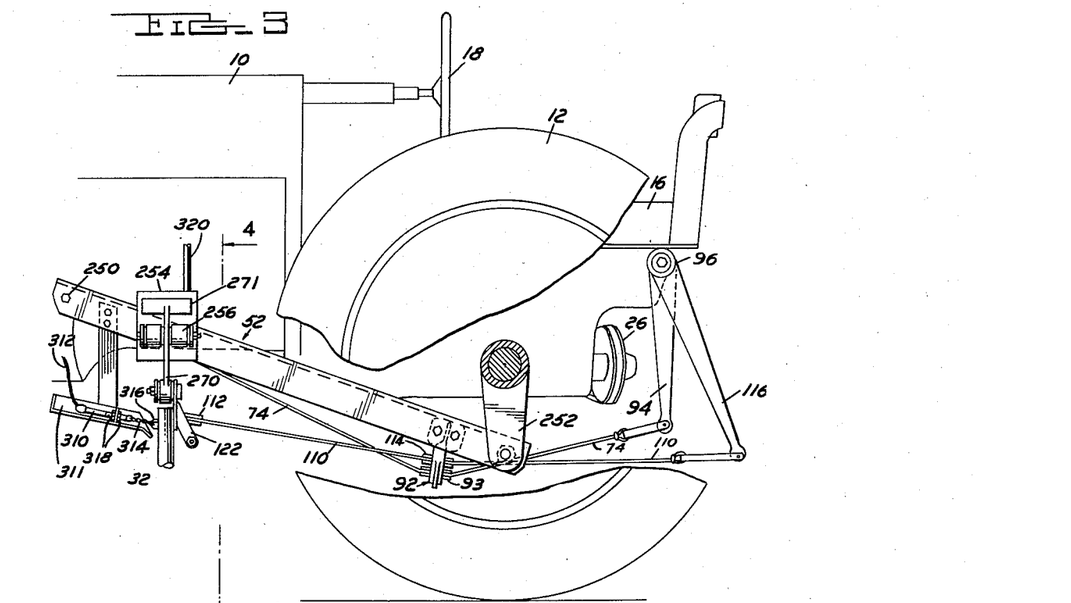
Figure 3 is a fragmentary side elevation showing the rear left side of the combined tractor-mower structure, with parts broken away.

The mower structure is designed for quick and easy attachment to and detachment from the tractor and for this purpose is provided with a right hand main frame and sheave support 50 as seen in Figure 1, a left hand main frame and sheave support 52 as seen in Figure 3, and a propeller tube bracket mounting 54 best seen in Figure 1. In addition, the forward end of the spring 38 is provided with quickly detachable means for connecting it to the front axle of the tractor.

Figure 2:
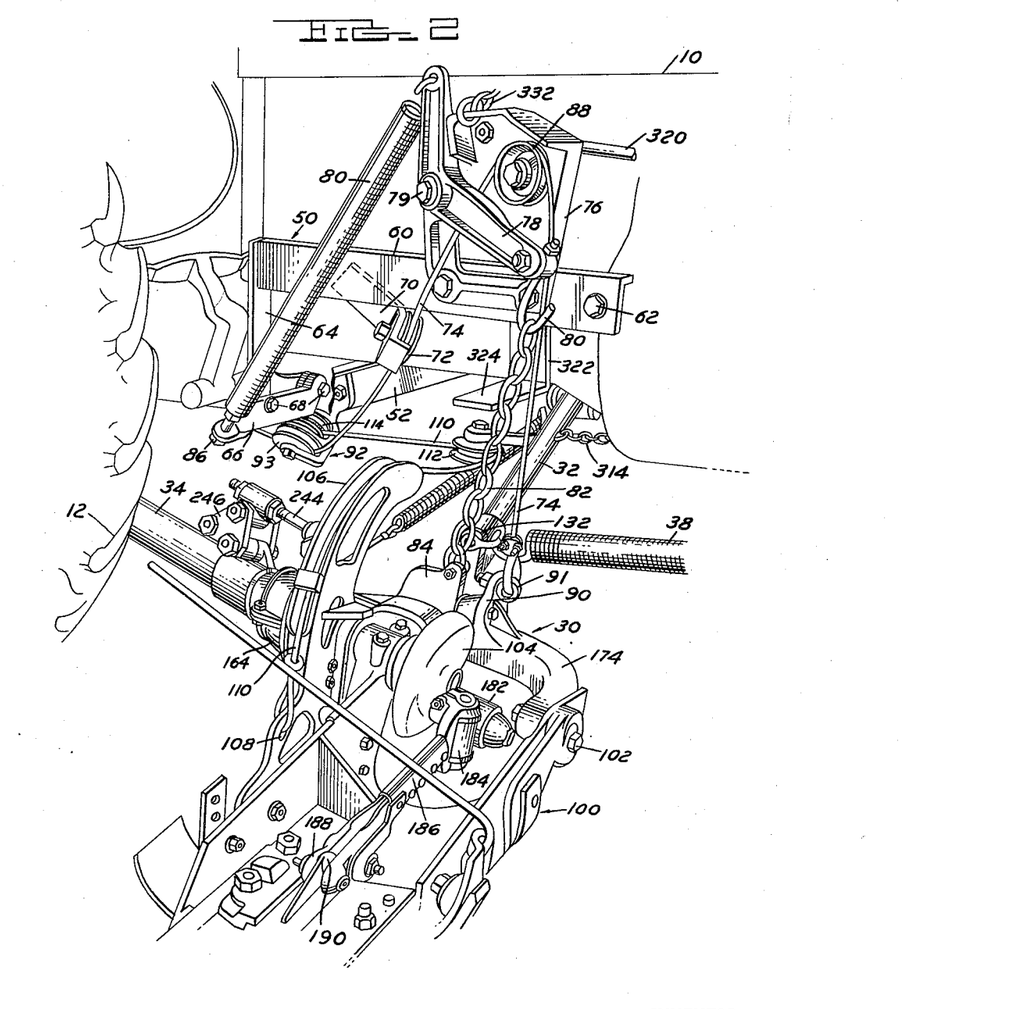
Figure 2 is an enlarged fragmentary perspective view of the combined tractor-mower structure as seen from the right side of the tractor.

Referring first to Figures 1 and 2, the right hand frame and sheave support 50 includes an angle iron 60 bolted to the tractor as indicated at 62 and including a depending leg 64 connected to a transverse bar 66 bolted or otherwise secured to the tractor as indicated at 68. Angle iron 60 is provided with a strap 70 carrying a sheave 72 around which a lifting cable 74 is reeved as will subsequently be described. Angle iron 60 in addition carries a supporting plate 76 to which is pivoted a bell crank lever 78, the pivot connection being illustrated at 79. One end of the bell crank lever 78 is connected to a balance spring 80, the other end of the spring 80 being connected to the transverse bar 66. The forward end of the bell crank lever 78 is provided with a hook 80 carrying a chain 82 which is secured to an upstanding lug 84 on the inner shoe 30. As will be obvious the spring 80 acting through the bell crank 78, thus counterbalances a portion of the weight of the inner shoe 30 and associated structure and thereby determines the pressure with which the actual mowing mechanism rests upon the ground. Preferably, the spring 80 is provided with conventional adjusting means 86 for varying the tension of the spring, thereby varying the pressure of the mowing mechanism on the ground.

The plate 76 as best seen in Figure 2, also is provided with a sheave 88 around which the lifting cable 74 is reeved. The cable 74 as best seen in Figure 2, is secured at its lower end to an upstanding ear or lug 90 by means of an eye bolt 91. At the left hand side of the machine and carried by the left hand main frame and sheave support 52 is a double pulley support indicated generally at 92. The cable 74 is led around a sheave 93 carried by the support 92 and thence rearwardly to the power actuating mechanism which will now be described.

Figures 5, 6, 7:
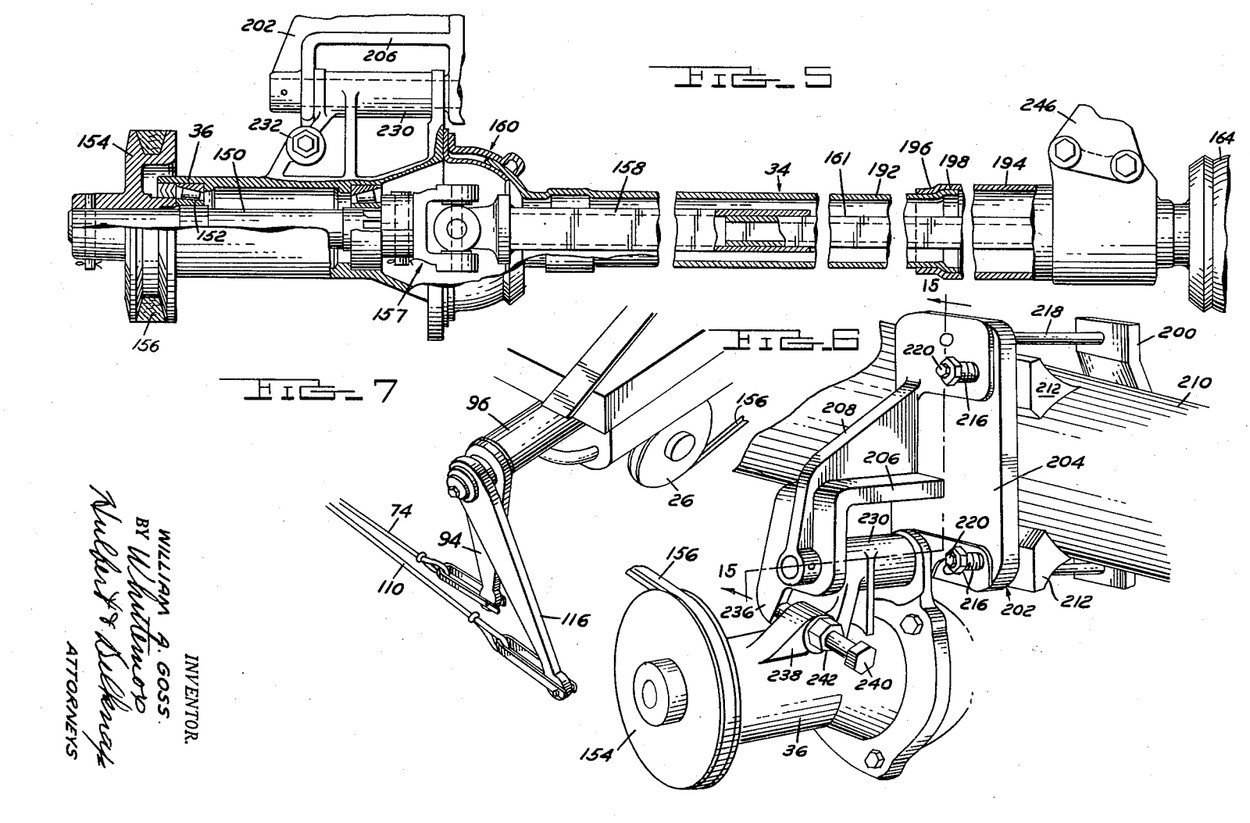
Figure 5 is an enlarged side elevation of the propeller tube with the tube partly in section and including supporting structure for the tube.
Figure 6 is an enlarged perspective view showing the mounting bracket for the rear end of the propeller tube and means for adjusting the bracket.
Figure 7 is an enlarged fragmentary perspective view showing the actuating levers on the tractor.
Figures 17, 18, 19:
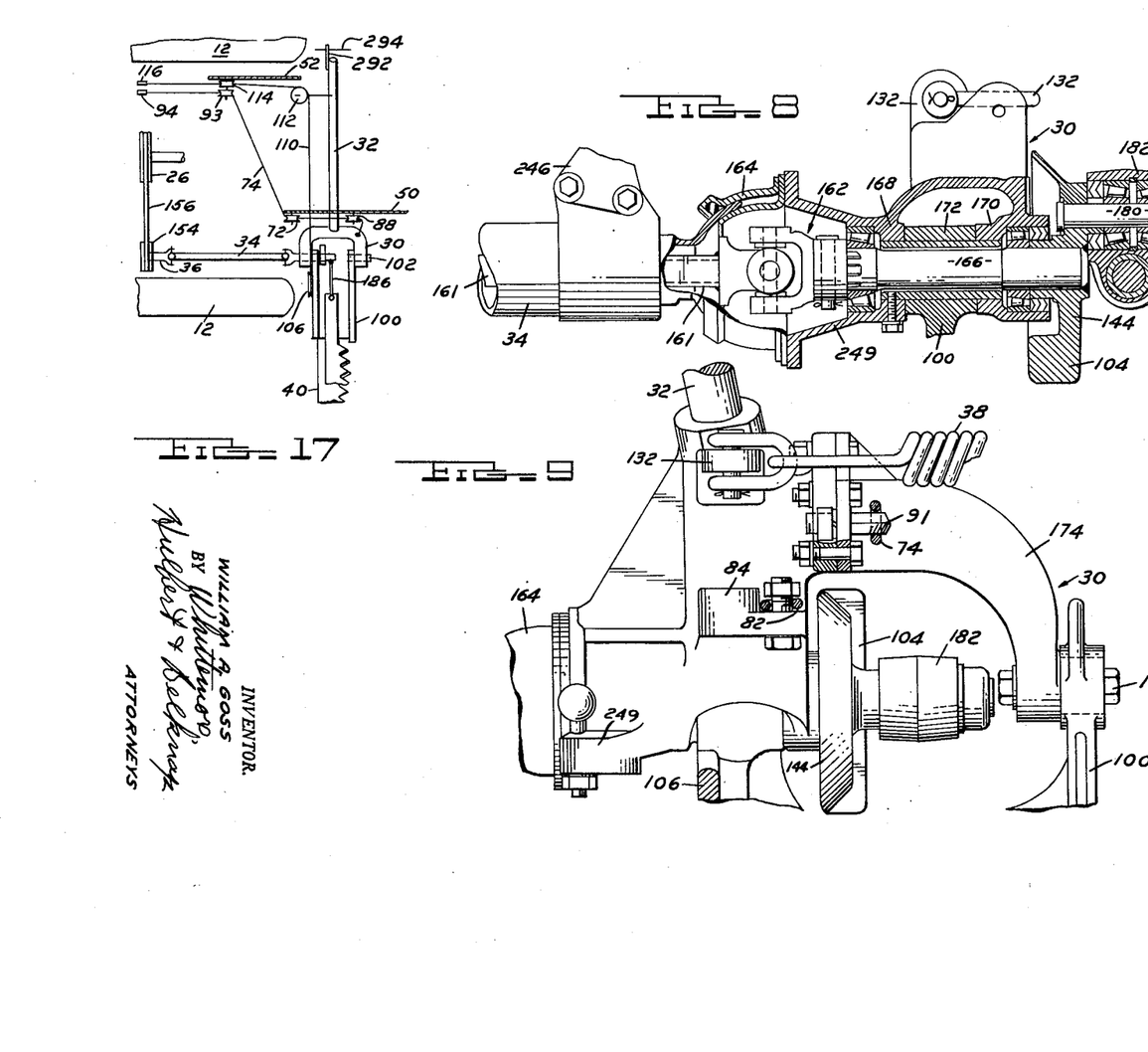
Figure 17 is a diagrammatic view, on a reduced scale, illustrating the relationship of parts with particular emphasis on the manner in which the actuating cables are provided.

The cable 74 as best seen in Figures 7 and 17, is connected at its opposite end to a power actuated lever 94 connected to a shaft located within a tubular housing 96 extending from the left hand side of the tractor 10. The lever 94 is adapted to be rocked about the axis of its shaft by hydraulic power means controlled by a manual lever 20, the arrangement being such that the position of the manual lever 20 determines the position of the power lever 94. As will be obvious, rocking movement of the lever 94 in a counterclockwise direction, as seen in Figure 7, draws on the cable 74 and hence is adapted to raise the inner shoe 30 in a vertical direction.

Connected to the inner shoe 30, and as best seen in Figures 1 and 2, is an outer shoe assembly 100. The outer shoe assembly 100 is pivoted to the inner shoe assembly about an axis determined by a first pivot connection 102 and a second pivot connection coaxial with the axis of a fly wheel 104 connected to the propeller shaft. Thus, the outer shoe 100 may be rocked about an axis which extends generally horizontally from front to rear of the assembly.

In order to provide for power adjustment of the outer shoe 100 and hence the cutter bar 40, the outer shoe has bolted thereto a quadrant 106. The quadrant includes an opening 108 into which is secured one end of a tilting cable 110. Secured to the drag bar 32 adjacent its left hand end is a sheave 112 around which tilting cable 110 is reeved. As best seen in Figure 17, the tilting cable 110 is led rearwardly from the sheave 112 to a second sheave 114 carried by the double pulley support 92 and thence is connected to the second power actuated lever 116.

Figure 4:
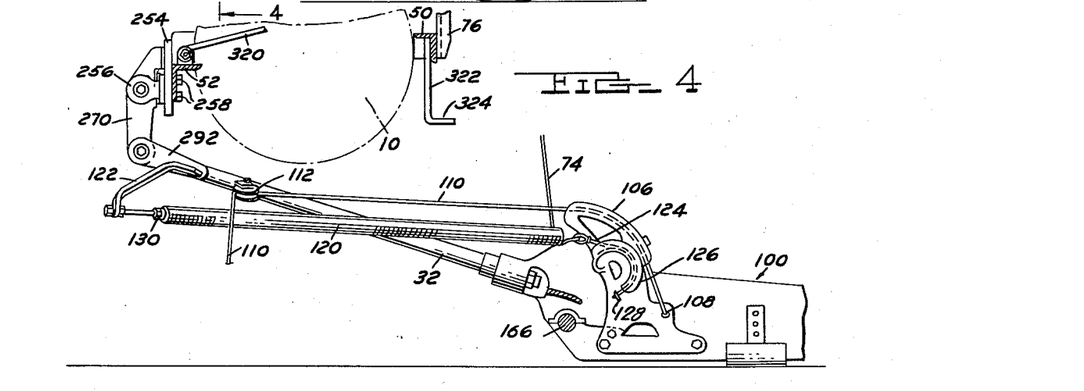
Figure 4 is a fragmentary sectional transverse view, on a reduced scale, of the device taken along the line 4—4 of Figure 3.

Means are provided for counterbalancing the torque of the outer shoe and cutter bar about its pivot axis with the inner shoe 30 and this means comprises a tension spring 120 best seen in Figure 4, secured at one end to an arm 122 secured to the left hand end of the drag bar 32. At its other end the spring 120 is connected to a short cable 124 which is led around a curved channel portion 126 on the quadrant plate 106. The free end of the cable 124 is suitably secured to the quadrant plate 106 as indicated at 128. Suitable means such as indicated generally at 130 are provided for adjusting the tension of the spring 120. As well illustrated in Figure 4, tension of the spring 120 exerts a counterclockwise lifting torque with respect to the outer shoe and cutter bar so as to control the effective weight of these parts resting upon the ground in use. The inner shoe 30 is provided with an upstanding ear 132 to which the rearward end of tension spring 38 is secured. At its forward end the spring 38 as best seen in Figure 1, is connected to a bracket 134 which as seen in this figure has a notch 136 therein adapted to receive a projecting lug 138 formed on the front axle 140. The pull spring 38 is provided with adjustable tensioning means 142 so as to control a force with which the drag bar, inner and outer shoes, and cutter bar are urged forwardly.

The means for effecting cutting reciprocation of the sickle 40 comprises a rear propeller shaft section 150 mounted in suitable bearings indicated at 152 in the rear propeller housing 36. The shaft 150 projects outwardly from the housing and is provided thereat with a drive pulley 154. The pulley 154 is driven from the power take-off pulley 26 by a V-belt or the like, indicated at 156.

In order to accommodate the adjusting means of the inner shoe and associated parts, the propeller drive structure includes a pair of universal joints. The rear universal joint is illustrated generally at 157 and connects the short shaft 150 with an enlarged hollow square shaft 158. The universal joint 157 is housed within a joint housing structure 160 which includes provision for angular adjustment as permitted by the universal joint while maintaining the housing in sealed condition. Telescopically associated with the hollow square shaft 158 is a second hollow square shaft 161, the rear end of which is telescopically received within the front end of the shaft 158.

A similar structure is provided at the forward end of the propeller shaft housing 34, as best seen in Figure 8. At this point the forward universal joint is shown at 162 and the housing therefor at 164. Again, the housing is provided with spherically shaped telescoping wall sections permitting angular adjustment at the universal joint while maintaining the housing in closed condition. Extending forwardly from the universal joint 162 is a short drive shaft 166 which at its outer end is connected to the fly wheel 104 previously referred to. The axis of the shaft 166, as previously mentioned, also determines the pivot axis between the inner and outer shoes and this construction is well illustrated in Figure 8 where the inner shoe 30 is shown as provided with spaced portions 168 and 170 between which is received an upwardly extending portion 172 formed on the outer shoe 100. The inner shoe 30 includes a yoke portion 174, the end of which is connected by the pivot means 102 previously referred to, leaving a space for the reception of the fly wheel 104 and drive means connected thereto.

As best seen in Figures 2 and 8, the fly wheel 104 includes an outwardly extending crank arm 180 having a sleeve 182 journaled thereon. The sleeve 182 includes a pivot support 184 to which the inner end of a pitman rod 186 is swiveled. The outer end of the pitman 186 includes a split ball socket joint 188 for connection to the usual ball connection 190 provided on the inner end of the cutter bar, and this may take place with the outer shoe in different angular positions of adjustment with respect to the inner shoe, and also with the inner shoe in different positions of vertical adjustment.

The propeller shaft housing 34, as best seen in Figure 5, includes two telescopically associated portions 192 and 194. The forward portion 194 is of reduced size at its rear end as indicated at 196, and forms a stop in cooperation with a laterally enlarged portion 198 provided at the forward end of the rear section 192. Thus, the tension of the pull spring 38 normally retains the shoes, drag bar, and cutter bar in a forward position as determined by the limiting abutment between portions 196 and 198.

Figure 13:
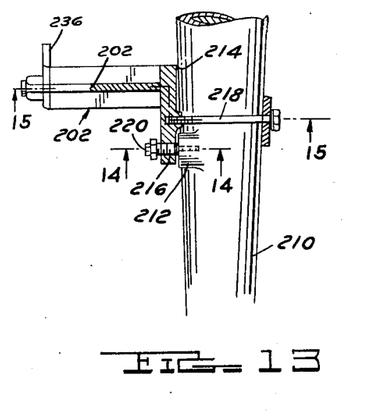
Figure 13 is an enlarged plan view partly in section showing the adjustable mounting for the bracket for supporting the rear of the propeller tube.
Figure 14:
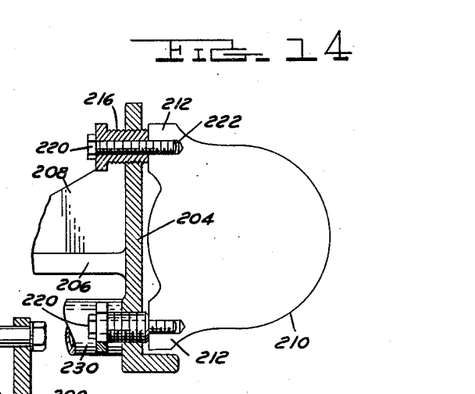
Figure 14 is an enlarged section on the line 14—14, Figure 13.
Figure 15:
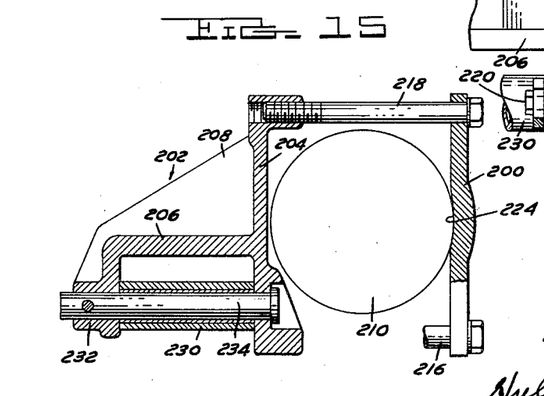
Figure 15 is an enlarged section on the line 15—15, Figure 13.

For proper operation it is essential that the axes of the pulleys 154 and 26 are in proper alignment. For this purpose the supporting bracket 54 for the rear propeller housing 36 is of special design, as best illustrated in Figures 1, 6, 13, 14, and 15. The bracket comprises a forward plate 200 and a rear bracket member 202 which includes a plate 204, and a rearwardly extending portion 206 reinforced by a web 208. The bracket assembly 54 is attached to the rear axle 210, which as best seen in Figure 13 is tapered but is provided with a pair of vertically spaced bosses 212 which are tapped for the reception of screws, as will subsequently appear. In order to provide for adjustment of the rear bracket member 202 a three-point contact with the axle is provided. One of the points of contact is at the inner edge of the bracket member 202 as indicated at the point 214. The other two points of contact are with the bosses 212, as best illustrated in Figure 14 which is a vertical section therethrough. The plate portion 204 is tapped for the reception of adjustable abutment screws 216 which extend through the tapped openings in the plate 204 and engage the rear surfaces of the bosses 212. The forward plate 200 and rear bracket member 202 are interconnected by tie bolts 218 which maintain the parts in assembly on the tapered rear axle 210. With the parts in general adjustment, angular adjustment of the rear bracket member 202 is accomplished by adjusting the threaded abutment screws 216 until the axis of the pulley 154 is strictly parallel to the axis of the power take-off pulley 26. At this time attaching screws 220 are passed through the abutment screws 216 and are threaded into suitably tapped recesses 222 provided in the bosses 212. Thereafter, tie bolts 218 may be tightened to complete the assembly. It will be observed that the inner surface of the forward plate 200 is convexly shaped as indicated at 224, to correspond to the outer convex surface of the rear axle 210. The rear propeller housing 36 is pivoted to the bracket 54 and more specifically, to the rear bracket member 202 as best seen in Figures 1 and 15. For this purpose the housing 36 includes a laterally extending sleeve 230 which is received between the plate portion 204 of the bracket member 202 and a depending apertured part 232 carried by the outwardly extending portion 206 thereof. The housing 36 is coupled to the bracket member 202 by a pin 234, the arrangement being such that the housing 36 as a unit, may rock about the axis of the pin 234. This rocking movement of the housing 36 permits adjustment of the housing so as to tension the belt 156 and the means for accomplishing this is best illustrated in Figure 6. In this figure the bracket member 202 is shown as provided with a depending abutment 236 and the rear propeller housing 36 is provided with an upstanding ear 238 through which an adjusting screw 240 extends. The screw 240 is provided with a lock nut 242 and its inner end engages the abutment 236. Obviously, advancing the screw 240 in the relationship illustrated in Figure 6, has the effect of rocking the housing 36 outwardly, thus tensioning the belt 156.

Means are provided for effecting angular adjustment of the inner shoe and the mechanism carried thereby about a transverse horizontal axis. This is rendered possible by the provision of the forward universal joint 162 and is accomplished by a threaded coupling member 244 which extends from a bracket 246 secured adjacent the forward end of the propeller shaft housing 34, to a support 248 rigidly secured to the rear portion 249 of the inner shoe 30, which forms a part of the universal housing 164. Obviously, this provides for angular adjustment between the inner shoe 30 and the propeller shaft housing.

Figures 10, 11:
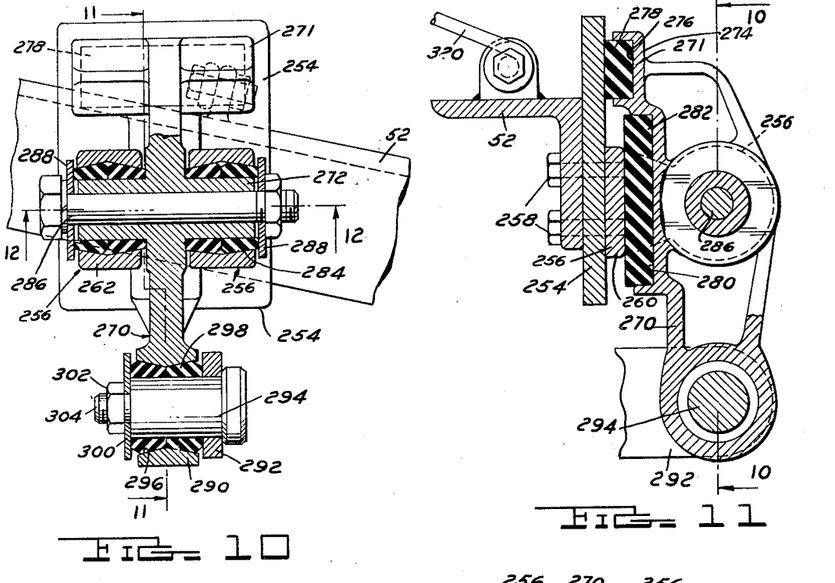
Figure 10 is a side elevation partly in section showing the bracket for supporting the drag bar, the section being taken on the line 10—10, Figure 11.
Figure 11 is an enlarged section on the line 11—11, Figure 10.
Figure 12:
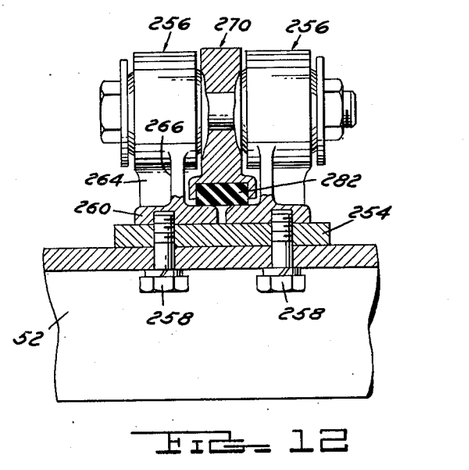
Figure 12 is an enlarged section on the line 12—12, Figure 10.

Reference was previously made to the fact that the tractor-mower assembly is constructed and arranged so as to arrest forward motion of the tractor upon rearward movement of the cutter bar. In order to permit such movement a special support is provided for the end of the drag bar 32 at the left hand side of the machine. Reference is made particularly to Figures 3, 4, 10, 11 and 12 for details of this structure. The left hand main frame and sheave bracket 52 as best seen in Figure 3, is bolted at its forward end as indicated at 250 to the tractor and is supported at its rear end by a depending strut 252 secured to the rear axle of the tractor. Support 52, as best seen in Figure 11, is in the form of an angle iron and bolted thereto is a plate 254. A pair of separate pivot supports 256 are carried by the plate 254 and more specifically, are assembled therewith by assembly bolts 258 which pass through the main bracket 52 and plate 254 into threaded recesses formed in the base plates 260 of pivot supports 256. Each of the pivot supports 256 includes a bearing portion 262 of circular cross-section as best seen in Figure 10, this being supported from its base by supporting webs 264 and 266. A hinge support arm, indicated generally at 270, for the drag bar 32 is provided which has an intermediate pivot portion including a pair of opposed outwardly extending tubular portions 272, each of which is received within one of the bearing portions 262 of the pivot supports 256. The hinge support arm 270 is provided with an upper portion 274 provided with a recess 276 for the reception of a pad 278 of resilient material such as rubber. The hinge support arm 270 is provided with a second recess 280 intermediate its ends for the reception of another pad 282, also formed of rubber or other suitable resilient material. The pad 278 rests against the upper end of the plate 254 and the pad 282 bears against the base plates 260 of the pivot supports 256, as best seen in Figure 12.

In addition to the foregoing, tapered bushings 284 of rubber or other suitable resilient material are provided to surround the tubular portions 272 and to be interposed between such tubular portions and the bearing portions 262 of the supports 256. Moreover, the resilient bushings 284 are dimensioned so as to extend substantially beyond either side of the bearing portions 262. The assembly is completed by a pivot bolt 286 which passes through the assembly. Washers 288 are provided and the arrangement is such, as best seen in Figure 10, that the hinge support arm 270 is mounted for rocking movement about the axis of the pivot bolt 286 and is further permitted slight movement relative to the pivot support members 256 in any direction due to the provision of the resilient material. At its lower end the hinge support arm 270 is provided with an apertured end portion 290 and connected to this end portion is the left hand end of the drag bar 32. For this purpose the drag bar 32 has welded or otherwise secured to its left hand end a metal strap or fishtail 292. The strap 292 is assembled to the hinge support arm 270 by means of a pivot pin 294 passing through the opening 296 provided at the lower end of the hinge support arm 270. Again, a pair of conical or tapered bushings 298 are provided intermediate the hinge pin and the inner surface of the opening 296. Moreover, bushings 298 extend outwardly beyond the sides of the hinge support arm as shown, thus spacing the strap 292 and the cooperating washer 300 from the sides of the hinge support arm 270. The parts are assembled by means of a nut 302 threaded onto the end 304 of the pivot pin 294. Thus, the drag bar 32 is permitted limited movement relative to the hinge support arm 270 by virtue of the clearance between the metal parts and the provision of the resilient compressible bushings 298.

While the relative movement thus provided for the drag bar 32 is not great, it will be appreciated that the cutter bar is thus pivoted for swinging movement at the right hand side of the tractor about a pivot axis located at the left hand side. Accordingly, angular movement of the drag bar need not be great to permit substantial rearward movement of the cutter bar.

In order to prevent injury to the structure in the event that the cutter bar strikes an immovable obstacle, means are provided for stopping forward movement of the tractor instantly upon rearward movement of the cutter bar. This means is illustrated in Figure 3 and comprises a switch 310 mounted on a plate 311 carried by support 52. The switch is connected into the ignition system of the tractor by an electric cable 312. The switch 310 is provided with a chain or other tension element 314 which connects to the drag bar 32 as indicated at 316. Accordingly, when the cutter bar strikes an obstacle the cutter bar, inner and outer shoes, and drag bar as a unit are rocked to the rear about a pivot axis provided by the drag bar support bracket. The switch 310 is adjustable toward and away from the drag bar 32, suitable lock nuts being shown at 318 for this purpose.

Accordingly, extremely small movement of the drag bar toward the rear may be caused to interrupt ignition to the tractor, thus bringing it to a halt and preventing injury to the mowing structure.

While the supporting structure as thus far described is sufficient to support the parts, it is preferred to provide a transverse tie bar connecting the right and left hand main frame brackets. This tie bar is shown at 320 in Figures 2, 4 and 11.

In order to limit upward movement of the inner shoe 30 the right hand main frame bracket 50 has secured thereto a depending angle iron 322 including an outwardly extending leg 324 which constitutes a stop and is adapted to engage the drag bar 32 to limit upward movement thereof.

From the foregoing detailed description of the parts the operation of the apparatus is believed to be obvious; however, attention is directed to the fact that the inner shoe is carried by a transversely extending drag bar, the left hand end of which is mounted so as to provide limited universal movement and particularly, limited rearward swinging movement. Power is transmitted for the reciprocation of the sickle bar through a propeller tube housing, the housing including telescoping parts provided with integral abutments which limit forward movement of the inner shoe. The inner shoe is urged to its extreme forward position by a pull spring whose tension may be adjusted so as to keep the inner shoe and cutter bar in extreme forward position against any desired and predetermined resistance.

The inner shoe is rotatable about the axis of the drag bar and means are provided for effecting such adjustment including a turnbuckle type adjusting device intermediate the inner shoe and the propeller shaft housing.

Figure 16:
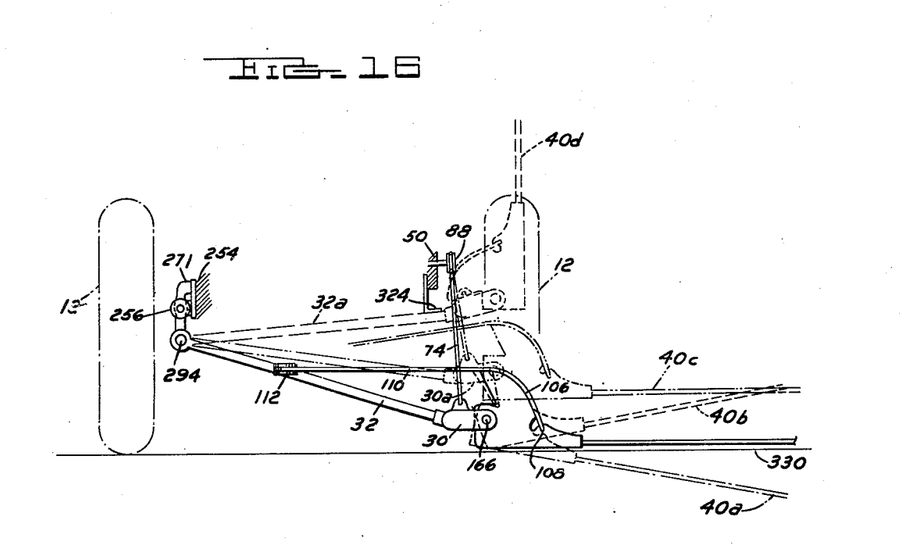
Figure 16 is an enlarged diagrammatic view illustrating some of the various positions of adjustment of the cutter bar.

Spring counterbalance means are provided for counterbalancing the weight of the mowing mechanism and the torque of the mowing mechanism as developed about its pivot connection to the inner shoe. Moreover, power means are provided for adjusting the cutter bar into several positions of adjustment. These positions are best illustrated in Figure 16 in which in the full line position the cutter bar 40 is shown as horizontal in its lower position. At this time if the power lever 116 is moved forwardly cable 110 is paid out and the cutter bar may rock downwardly about the axis of its pivot connection with the inner shoe to the dotted line position as indicated at 40a. On the other hand, if the lever 116 is energized to move rearward, thus tensioning the cable 110, the mower arm will be rocked upward about the pivot connection between the inner and outer shoes to the dotted line position illustrated at 40b. Moreover, if the power lever 94 is energized to move rearwardly tension is applied through the cable 74, thus raising the inner shoe 30 which may be thus raised to the intermediate position shown at 30a. Obviously, by appropriate adjustment of the levers 94 and 116, the cutter bar may be brought into an elevated horizontal position illustrated at 40c. This position as will be apparent, is useful for top foliage or for example, may be employed if the tractor is driven along a gutter and the cutter bar is elevated to cut grass on an adjacent area.

Further movement of the lever 94 rearwardly elevates the drag bar 32 to its extreme upper position illustrated at 32a at which time it engages the stop 324. At this time the outer shoe may be rocked to its limiting position thus bringing the cutter bar 40 to the vertical transport position indicated in dotted lines at 40d. In order to retain the cutter bar in transport position plate 76 (Figure 2) is provided with a transport chain 332 having a hook (not shown) for connection to the inner shoe in elevated position. After the parts have been elevated to transport position as shown in Figure 16, the chain is fastened to the inner shoe and the parts thereafter lowered until the weight of the movable structure is taken by the chain.

The drawings and the foregoing specification constitute a description of the improved power mower in such full, clear, concise and exact terms as to enable any person skilled in the art to practice the invention, the scope of which is indicated by the appended claims.

What I claim as my invention is:

1. A mower attachment for a tractor having a power take-off shaft and a pair of power actuated levers, comprising a drag bar for universal pivotal attachment to one side of said tractor, an inner shoe at the free end of said drag bar, an outer shoe and cutter bar pivoted to said inner shoe for vertical angular adjustment, a first cable connecting one of said levers with said inner shoe, a sheave located generally above said inner shoe over which said first cable is led, a second cable connecting the other of said levers with said outer shoe above its pivot axis, and a second sheave carried by said drag bar adjacent said pivotal attachment over which said second cable is led, the arrangement providing for selective power raising and tilting of said cutter bar.

2. A mower attachment for a tractor having a power take-off shaft and a pair of power actuated levers comprising a drag bar for pivotal attachment to one side of said tractor, an inner shoe at the free end of said drag bar, an outer shoe and cutter bar pivoted to said inner shoe for vertical angular adjustment, a first main frame bracket at one side of the tractor, double sheaves on said bracket, a pivot connection on said bracket for supporting one end of said drag bar, a second main frame bracket on the other side of said tractor, a pair of separated sheaves on said second bracket one of which is generally above said inner shoe, a sheave on said drag bar, a first cable leading from one of said levers over one of said double sheaves, thence over said sheaves on said second bracket and connected to said inner shoe, and a second cable leading from the other of said levers over the other of said double sheaves, thence over the sheave on said drag bar and connected to said outer shoe above the pivot connection between said shoes.

References Cited in the file of this patent

UNITED STATES PATENTS

| Number | Name | Date |
|---|---|---|
| 919,039 | Leoni | Apr. 20, 1909 |
| 919,040 | Leoni | Apr. 20, 1909 |
| 1,512,956 | Thomas et al. | Oct. 28, 1924 |
| 1,528,553 | Kennedy et al. | Mar. 3, 1925 |
| 1,855,838 | Kronick | Apr. 26, 1932 |
| 2,034,919 | Olson | Mar. 24, 1936 |
| 2,129,435 | Morris | Sept. 6, 1938 |
| 2,245,452 | Simpson et al. | June 10, 1941 |
| 2,249,633 | MacDonald et al. | July 15, 1941 |
| 2,311,095 | Simpson et al. | Feb. 16, 1943 |
| 2,324,563 | Custenborder | July 20, 1943 |
| 2,328,838 | Oberlink | Sept. 7, 1943 |
| 2,457,693 | Leicy | Dec. 28, 1948 |
| 2,482,251 | Downing et al. | Sept. 20, 1949 |
| 2,495,986 | Schroeppel | Jan. 31, 1950 |
| 2,502,805 | Spurlin | Apr. 4, 1950 |
| 2,518,317 | Hilblom | Aug. 8, 1950 |
| 2,617,242 | Iverson | Nov. 11, 1952 |